United States Patent [19]
Mueller et al.

[11] Patent Number: 5,324,697
[45] Date of Patent: Jun. 28, 1994

[54] PHILLIPS CATALYST AND ITS USE FOR PREPARING ETHYLENE HOMOPOLYMERS AND COPOLYMERS

[75] Inventors: Hans-Joachim Mueller, Gruenstadt; Rainer Konrad, Goennheim; Guenther Schweier, Friedelsheim; Siegfried Weber, Weinheim; Roland Saive; Peter Koelle, both of Ludwigshafen, all of Fed. Rep. of Germany

[73] Assignee: BASF Aktiengesellschaft, Ludwigshafen, Fed. Rep. of Germany

[21] Appl. No.: 904,924

[22] Filed: Jun. 26, 1992

[30] Foreign Application Priority Data

Jun. 28, 1991 [DE] Fed. Rep. of Germany ....... 4121355

[51] Int. Cl.$^5$ ............................................. C08F 4/69
[52] U.S. Cl. ........................... 502/112; 502/117; 502/150; 502/171; 526/105
[58] Field of Search ............... 502/112, 117, 150, 171

[56] References Cited

U.S. PATENT DOCUMENTS

| | | | |
|---|---|---|---|
| 4,364,842 | 12/1982 | McDaniel | 502/150 |
| 4,806,513 | 2/1989 | McDaniel et al. | 502/117 X |
| 4,814,308 | 3/1989 | Konrad et al. | 502/107 |
| 4,877,763 | 10/1989 | McDaniel et al. | 502/117 |
| 5,030,431 | 7/1991 | Glemza | 502/208 X |

FOREIGN PATENT DOCUMENTS

| | | |
|---|---|---|
| 0055863 | 7/1982 | European Pat. Off. |
| 55863 | 7/1982 | European Pat. Off. |
| 215336 | 3/1987 | European Pat. Off. |
| 0264895 | 4/1988 | European Pat. Off. |

OTHER PUBLICATIONS

Rideal, *Concepts in Catalysis*, p. 5, by Academic Press, N.Y., N.Y. (1968–no month available).

*Primary Examiner*—Patrick P. Garvin
*Attorney, Agent, or Firm*—Keil & Weinkauf

[57] ABSTRACT

A novel Phillips catalyst for the homopolymerization of ethylene and the copolymerization of ethylene with α-olefins contains as catalytically active components a specific chromium catalyst on an aluminum phosphate support and cocatalysts of the formula I to IV,

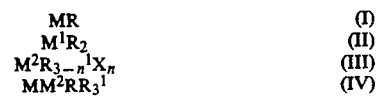

where
M is lithium, sodium and potassium,
$M^1$ is magnesium and zinc,
$M^2$ is boron and aluminum,
R is $C_1$–$C_{10}$-alkyl and $C_6$–$C_{20}$-aryl,
$R^1$ is R and $C_1$–$C_{10}$-alkoxy and $C_6$–$C_{20}$-aryloxy,
X is chlorine, bromine and iodine,
n is 0, 1 and 2

The chromium catalyst on an aluminum phosphate support can be obtained by applying chromium compounds to a finely divided aluminum phosphate with a P:Al molar ratio near to or equal to 1 and a pore volume of >1 cm$^3$/g and activating the resulting intermediate at elevated temperatures in an oxidizing atmosphere. The novel Phillips catalyst has an exceptionally long duration of activity and its productivity can be increased further by adding hydrogen.

6 Claims, No Drawings

PHILLIPS CATALYST AND ITS USE FOR PREPARING ETHYLENE HOMOPOLYMERS AND COPOLYMERS

The present invention relates to a novel Phillips catalyst for the homopolymerization of ethylene and the copolymerization of ethylene with α-olefins, containing as catalytically active components a specific chromium catalyst on an aluminum phosphate support and at least one selected organometallic cocatalyst.

The use of chromium catalysts on an aluminum phosphate support together with organometallic cocatalyst for preparing homopolymers of ethylene and copolymers of ethylene with α-olefins by the Phillips process is disclosed in US-A 4 364 842. The preparation of these known Phillips catalysts starts from non-stoichiometric aluminum phosphates with a P:Al molar ratio of <1, the preferred range of P:Al molar ratios in U.S. Pat. No. 4,364,842 being from 0.6 to 0.8, because the relevant Phillips catalysts are more active than other known Phillips catalysts and provide polymers with a comparatively favorable profile of technical properties. The pore volumes of the aluminum phosphates in this case are distinctly less than 1 cm$^3$/g.

These known Phillips catalysts additionally contain organometallic cocatalysts, and trialkylboranes, especially triethylborane, have proven to be particularly effective. The use of these cocatalysts increases the sensitivity of the known Phillips catalyst to the regulating action of hydrogen. The wide-ranging investigations in U.S. Pat. No. 4,364,842 additionally show that the action, if there is any, of organolithium, -magnesium, -aluminum, -antimony, tin and -zinc cocatalysts does not approach that of triethylborane. In addition, it is expressly stated that lithium tetrabutylborate and triphenylborane have only a small cocatalyst effect. The person skilled in the art therefore no longer considers these compounds as cocatalysts in further development of the known Phillips catalysts.

Although the Phillips catalysts of U.S. Pat. No. 4,364,842 reach their activity maximum a few minutes after being metered into the polymerization reactor, their activity has fallen to near zero after only a comparatively short polymerization time. This is a particularly serious disadvantage because the average duration of activity of the known Phillips catalysts is far below the usual average residence times of a Phillips catalyst in the conventional loop reactors used on the industrial scale to prepare ethylene homopolymers and copolymers.

By contrast, EP-A 0 215 336 discloses a Phillips catalyst based on an aluminum phosphate with a P:Al molar ratio near to or equal to 1 and a pore volume of >1 cm$^3$/g, in particular >1.3 cm$^3$/g. Nothing is said about the use of organometallic cocatalysts in EP-A 0 215 336.

This known Phillips catalyst also has a disadvantageously short average duration of activity. In addition, it is comparatively insensitive to the regulating action of hydrogen and it provides only polymers with exceptionally low melt indices (melt index, MI, and high load melt index, HLMI), which is extremely disadvantageous for the processibility of the relevant polymers.

It is an object of the present invention, based on U.S. Pat. No. 4,364,842 and EP-A 0 215 336, to find a novel, highly productive Phillips catalyst which no longer has the disadvantages of the prior art, remains catalytically active over a distinctly longer period than hitherto possible, is very sensitive to the regulating action of hydrogen, and can be used to prepare, both by the suspension process and the gas-phase fluidized bed process, high yields of ethylene homopolymers and copolymers with a property profile which can be widely varied, in particular in terms of the molecular weight distribution and the melt indices. Another aim is that the productivity of the novel Phillips catalyst no longer decreases on addition of hydrogen but, on the contrary, is even further increased thereby.

We have found that these objects are achieved in an elegant and effective manner by a novel Phillips catalyst which contains as catalytically active component a specific chromium catalyst on an aluminum phosphate support, based on an aluminum phosphate of virtually or completely stoichiometric composition and with a large pore size, and specifically selected organometallic cocatalysts. In view of the prior art, it was not expected that the objects of the present invention could be achieved in particular by the combination of the specific chromium catalyst on an aluminum phosphate support and the selected organometallic cocatalysts.

Accordingly, the present invention relates to a novel Phillips catalyst for the homopolymerization of ethylene and the copolymerization of ethylene with α-olefins, containing as catalytically active components A) a chromium catalyst on an aluminum phosphate support, obtainable by applying chromium compounds to a finely divided aluminum phosphate with a P:Al molar ratio near to or equal to 1 and a pore volume of >1 cm$^3$/g and activating of the resulting intermediate at elevated temperatures in an oxidizing atmosphere, and B) at least one compound of the formulae I to IV

$$MR \qquad (I)$$
$$M^1R_2 \qquad (II)$$
$$M^2R_{3-n}{}^1X_n \qquad (III)$$
$$MM^2RR_3{}^1 \qquad (IV)$$

where

M is lithium, sodium and potassium,

M$^1$ is magnesium and zinc,

M$^2$ is boron and aluminum,

R is C$_1$–C$_{10}$-alkyl and C$_6$–C$_{20}$-aryl,

R$^1$ is R and C$_1$–C$_{10}$-alkoxy and C$_6$–C$_{20}$-aryloxy,

X is chlorine, bromine and iodine, n is 0, 1 and 2;

as cocatalyst.

The novel Phillips catalyst for the homopolymerization of ethylene and the copolymerization of ethylene with α-olefins is called "Phillips catalyst according to the invention" for brevity hereinafter.

One essential catalytically active component of the Phillips catalyst according to the invention is a chromium catalyst on an aluminum phosphate support (A), which can be obtained in a conventional manner by applying chromium compounds to a finely divided aluminum phosphate and by activating the resulting intermediate at elevated temperatures in an oxidizing atmosphere.

However, it is essential for the Phillips catalyst according to the invention that the finely divided aluminum phosphate has a P:Al molar ratio near to or equal to 1 and a pore volume of >1 cm$^3$/g. This means the aluminum phosphate to be used according to the invention is of virtually or completely stoichiometric composition. It is advantageous in this connection according to the invention when the P:Al molar ratio is above 0.8:1. There are further advantages for the Phillips catalyst according to the invention and for the (co)polymers prepared therewith when the P:Al molar ratio is >0.95:1. The P:Al molar ratio of 1:1 is very particularly advantageous according to the invention and is therefore very particularly preferred in the preparation of the Phillips catalysts according to the invention.

It is also essential for the Phillips catalyst according to the invention that the finely divided aluminum phosphate has a pore volume of >1 cm$^3$/g. If the pore volume is less than this, the advantages to be achieved according to the invention are no longer obtained. On the other hand, if an aluminum phosphate with a pore volume of >1 cm$^3$/g in particular >1.3 cm$^3$/g, is used for preparing a Phillips catalyst according to the invention, this has particular advantages both for the Phillips catalyst according to the invention and for the (co)polymers prepared therewith. This is why finely divided aluminum phosphates with pore volumes of >1.3 cm$^3$/g are very particularly preferably used according to the invention.

Outstanding Phillips catalysts according to the invention are obtained when finely divided aluminum phosphate with a P:Al molar ratio = 1 and a pore volume of >1.3 cm$^3$/g is used.

The aluminum phosphates to be used according to the invention are known compounds and are prepared, for example, by neutralizing acidic aqueous solutions of aluminum and phosphate ions. The neutralization is carried out in such a way that a hydrogel is formed. This can be dried by azeotropic distillation or by washing out with a volatile solvent which is miscible with water. However, it is also possible to use conventional methods such as spray drying or oven drying. The drying results in an aluminum phosphate xerogel which is the support for the chromium catalyst.

It is known that silicon, iron and/or boron compounds can be incorporated in this xerogel when it is prepared by coprecipitation. It is also possible to admix phosphorus compounds such as triethyl phosphate.

Suitable and preferred for the application of the chromium compound to the aluminum phosphate which is described above in detail are water- and alcohol-soluble chromium compounds such as chromium(III) nitrate, chromium(III) acetate or chromium(VI) oxide. These chromium compounds can be applied to the hydrogel in aqueous solution. It is also possible for hydrocarbon-soluble chromium compounds to be applied to the xerogel from non-aqueous solutions. One example of a chromium compound soluble in hydrocarbons is tert-butyl chromate. In addition, the catalytically active chromium can be incorporated in the support even during the preparation of the aluminum phosphate hydrogel, for example by coprecipitation.

Irrespective of the method used to apply the chromium catalyst to the aluminum phosphate described above in detail, the chromium content is from 0.01 to 10% of the weight of the aluminum phosphate. If less than 0.01% by weight of chromium is used, the catalytic activity of the relevant Phillips catalyst is very unsatisfactory. On the other hand, an increase in the content above 10% by weight is not justified by the further increase in the catalytic activity. Accordingly, the range from 0.01 to 10% by weight is an optimal range within which the chromium content of the aluminum phosphate can be varied widely and suited to the given technical conditions on the one hand and the required property profile of the (co)polymers on the other. Within this optimal range, that from 0.1 to 5% by weight of chromium should be emphasized because Phillips catalysts according to the invention with this chromium content are particularly advantageous. Phillips catalysts according to the invention in which the chromium catalyst on an aluminum phosphate support contains from 0.5 to 1.5% by weight, in particular 1% by weight of chromium, proved to be very particularly advantageous.

In the preparation of the Phillips catalyst according to the invention, the chromium-containing intermediate described above in detail is activated at elevated temperatures in an oxidizing atmosphere, which results in the chromium catalyst on an aluminum phosphate support (A) which is to be used according to the invention. The methods used for this activation step are not unusual, on the contrary it can be carried out in a conventional manner by heating the intermediate at from 300 to 900, preferably 500° to 750° C., in an oxidizing atmosphere. Examples of suitable oxidizing atmospheres are pure oxygen, oxygen/noble gas mixtures and air, and air is preferably used for economic reasons. The activation is generally from 30 minutes to 24 hours, with from 1 to 4 hours being advantageous. Examples of particularly suitable chromium catalysts on an aluminum phosphate support (A) to be used according to the invention, and advantageous processes for the preparation thereof, are disclosed in EP-A 0 215 336.

The other essential component of the Phillips catalyst according to the invention is at least one cocatalyst (B) of the formulae I to IV.

In the formula I, M is lithium, sodium and potassium, of which lithium is advantageous. R is $C_1$-$C_{10}$ alkyl or $C_6$-$C_{20}$ aryl, in particular $C_1$-$C_6$-alkyl and phenyl.

In the formula II, $M^1$ is magnesium and zinc, of which magnesium is advantageous. In this case, R has the abovementioned meanings.

In the formula III, $M^2$ is boron and aluminum, of which boron is advantageous. $R^1$ has the meaning of R or is $C_1$-$C_{10}$-alkoxy and $C_6$-$C_{20}$-aryloxy. $R^1$ is advantageously $C_1$-$C_6$-alkyl, phenyl, $C_1$-$C_6$-alkoxy or phenoxy. X is chlorine, bromine and iodine, in particular chlorine. The number n is 0 or 1 or 2.

Examples of various suitable cocatalysts (B) to be used according to the invention are $C_1$-$C_6$-alkyllithium, di($C_1$-$C_6$-alkyl)magnesium, di($C_1$-$C_6$-alkyl)zinc, tri($C_1$-$C_6$-alkyl ) borane, tri($C_1$-$C_6$-alkyl) borate, triphenyl borane, triphenyl borate, di($C_1$-$C_6$-alkyl) ($C_1$-$C_6$-alkoxy ) -, di($C_1$-$C_6$-alkyl)phenyl-, di($C_1$-$C_6$-alkoxy)($C_1$-$C_6$-alkyl)-, di($C_1$-$C_6$-alkoxy)phenyl-, ($C_1$-$C_6$-alkyl)-diphenyl- and/or ($C_1$-$C_6$-alkoxy)diphenylborane, tri($C_1$-$C_6$-alkyl)aluminum, di($C_1$-$C_6$-alkyl)aluminum ($C_1$-$C_6$-alkoxide), di($C_1$-$C_6$-alkyl)aluminum chloride and/or ($C_1$-$C_6$-alkyl)aluminum dichloride.

Examples of particularly well suited cocatalysts (B) of the formulae I to III are butyllithium, di-n-butylmagnesium, ethyldichloroborane, diethylboron ethoxide, triethylborane, diethylaluminum chloride, diethylaluminum ethoxide, ethylaluminum dichloride and triethylaluminum, of which n-butyllithium and triethylborane are very particularly advantageous and are therefore also very particularly preferably used.

In the formula IV, M, $M^1$, $M^2$, R and $R^1$ have the meanings indicated above in detail. Examples of very particularly advantageous cocatalysts of the formula IV are lithium tetra-n-butylborate and lithium triethyl-n- butylborate, of which the latter is particularly advantageous and is therefore very particularly preferably used.

The use of the cocatalysts (B) of the formulae I and III where n is 0, or the use of the cocatalysts (B) of the formula IV has further special advantages for the Phillips catalyst according to the invention. In this case, at least one of the organolithium compounds of the formula I and at least one of the boron compounds of the formula III are preferably used. It is particularly advantageous according to the invention when the B:Li molar ratio is from 4:1 to 1:4, preferably from 3:1 to 1:3 and in particular 2:1 to 1:2. When cocatalysts (B) of the formula IV are used, this ratio is 1:1.

The molar ratio of chromium catalyst on an aluminum phosphate support to cocatalyst (B) in the Phillips catalyst according to the invention can be varied within a wide range. This makes it possible to suit the Phillips catalyst according to the invention to the particular apparatus conditions on the one hand and the required property profile of the (co)polymers on the other. However, if the boron compounds of the formulae III or IV described above are used, a Cr:B molar ratio of from 1:1 to 1:10, in particular from 1:2 to 1:6, is advantageous. If the mixtures, described above, of organolithium compounds of the formula I and boron compounds of the formula III or the organolithium and -boron compounds of the formula IV are used, the chromium:-boron:lithium molar ratio is advantageously in the range from 1:2:0.25 to 1:6:24, in particular from 3:3 to 1:5:5.

The cocatalysts (B) described above in detail can be added before the actual (co)polymerization in the form of a solution or a suspension to the activated chromium catalyst on an aluminum phosphate support (A). However, it is advantageous to meter the organometallic cocatalyst (B) directly into the polymerization reactor used in each case.

Before the addition of the organometallic cocatalysts (B), it is also possible to reduce the activated chromium catalyst on an aluminumphosphate support (A) by ethylene and/or α-olefins, carbon monoxide or triethylborane.

The Phillips catalyst according to the invention is outstandingly suitable for preparing homopolymers of ethylene and copolymers of ethylene with α-olefins by the Phillips process. Suitable polymerization reactors for this purpose are the conventional loop reactors, autoclaves and gas-phase fluidized bed reactors.

Examples of suitable comonomers which can be copolymerized with ethylene are 1-propene, 1-butene, 1-pentene, 1-hexene, 1-octene and the conjugated and non-conjugated diolefins, butadiene, 1,3-pentadiene, 2,3-dimethylbutadiene, 1,4-pentadiene, 1,5-hexadiene and vinylcyclohexene. The comonomers are generally added to the ethylene in an amount such that the resulting ethylene copolymers are composed of from 96 to 99.8% by weight of ethylene units and from 0.2 to 4% by weight of units of at least one comonomer.

The Phillips catalyst according to the invention has special unexpected advantages. Thus, it is exceptionally sensitive to the regulating action of hydrogen. In this it does not differ from known Phillips catalysts as described, for example, in U.S. Pat. No. 4,364,842. However, the metering-in of hydrogen brings about a distinct reduction in the productivity of the known Phillips catalysts. By contrast, the productivity of the Phillips catalyst according to the invention is, surprisingly, very considerably increased by hydrogen. The Phillips catalyst according to the invention is, in particular, outstandingly suitable for homo- and copolymerization of ethylene by the conventional particle form process in a suspension of a saturated hydrocarbon and ethylene under from 20 to 50, in particular 40, bar and at from 90° to 110° C.

EXAMPLES 1 to 4

Preparation of ethylene homopolymers with the aid of Phillips catalysts according to the invention A chromium catalyst on an aluminum phosphate support (A) was prepared for Examples 1 to 4 by the following process:

250.g of aluminum phosphate with a P:Al molar ratio of 1:1 and a pore volume of 1.36 cm$^3$/g were suspended in 1.5 l of methanol. 150 ml of a methanolic $Cr(NO_3)_3 \cdot 9$-$H_2O$ solution which contained 18 g of the salt were added to the resulting suspension. After the suspension had been stirred for 10 minutes it was substantially colorless, and then the water and the methanol were removed by distillation under reduced pressure. The oxidative activation of the intermediate obtained in this way was carried out in a stream of air at 650° C. for 2 hours in a fluidized bed activator. The resulting chromium catalyst on an aluminum phosphate support (A) was used for the polymerization experiments in Examples 1 to 4.

The general procedures for the polymerization in Examples 1 to 4 was as follows:

A 1 l autoclave was used as reaction vessel. This was heated to 95° C. and flushed several times with ethylene. Then, while stirring, 500 ml of isobutane and a suspension of the cocatalyst (B) used in each case in 1.5 ml of heptane were metered into the autoclave. After the required polymerization temperature of 95° C. had been reached, a defined amount of the chromium catalyst on an aluminum phosphate support (A), described above, to be used according to the invention was injected with ethylene under a pressure of 25 bar into the reactor. Further ethylene was added after this until the polymerization pressure of 40–42 bar was reached. During the polymerization the pressure in the autoclave was kept in this range by metering in further ethylene. The polymerization was stopped after 90 minutes by releasing the pressure.

The table provides information on the amount and the composition of the Phillips catalysts according to the invention and other essential parameters used in the process. The table also summarizes the yield and the properties of the ethylene homopolymers obtained with the aid of the Phillips catalysts according to the invention.

In this connection, the high load melt index (HLMI) was determined by the DIN 53 735 method at 190° C. with a load of 21.6 kp, the melt index (MI) was determined by the DIN 53 735 method at 190° C. and with a load of 2.16 kp, the density was determined by the DIN 53 479 method, the Staudinger index was determined by the DIN 53 728 method and the weight average molecular weight $\overline{M}_w$ was determined by gel permeation chromatography.

The table shows that the productivity of the Phillips catalyst according to the invention can be increased by adding hydrogen. It also demonstrates that the mixtures of organolithium and -boron cocatalysts (B) show very particularly advantageous effects with regard to the increase in productivity and improvement in the property profile of the polymers.

TABLE

Homopolymerization of ethylene with the aid of Phillips catalysts according to the invention, and the properties of the resulting homopolymers (Examples 1 to 4)

| Example No. | 1 | 2 | 3 | 4 |
|---|---|---|---|---|
| Phillips catalyst: | | | | |
| Component (A)(mg) | 36 | 27.5 | 22 | 22 |
| 1. Component (B) (mg) | 0.298 | 0.207 | 0.265 | 0.165 |
| Compound | TEB[a] | TEB[a] | TEB[a] | TEB[a] |
| 2. Component (B) (mg) | — | 0.137 | — | 0.109 |
| Compound | — | BuLi[b] | — | BuLi[b] |
| Cr:B molar ratio | 1:4 | — | 1:4 | — |
| Cr:B:Li molar ratio | — | 1:4:4 | — | 1:4:4 |
| Hydrogen (ml) | — | — | 80 | 80 |
| Average duration of activity (min) | app. 20 | app. 60 | app. 30 | app. 90 |
| Decrease in activity of the catalyst during the polymerization | rapid | slow | rapid | slow |
| Productivity (g of polyethylene/g of catalyst) | 2330 | 5160 | 2900 | 7600 |
| Ethylene homopolymer: | | | | |
| High load melt index HLMI (g/10 min) | 490 | 99 | 397 | 298 |
| Melt index MI (g/10 min) | 8.1 | 0.2 | 5.1 | 3.2 |
| Density (g/cm$^3$) | 0.968 | 0.964 | 0.966 | 0.966 |
| $\overline{M}_w$ | $1.04 \cdot 10^5$ | $1.88 \cdot 10^5$ | $8.9 \cdot 10^4$ | $1.27 \cdot 10^5$ |
| $\overline{M}_w/\overline{M}_n$ | 14 | 25 | 11 | 14 |
| Staudinger index Jg (g/cm$^3$) | 140 | 230 | 150 | 170 |

[a] TEB = triethylborane
[b] BuLi = n-butyllithium

We claim:

1. A Phillips catalyst for the homopolymerization of ethylene an the copolymerization of ethylene with α-olefins, containing as catalytically active components
   A) a chromium catalyst on an aluminum phosphate support, obtainable by applying chromium compounds to a finely divided aluminum phosphate with a P/Al molar ratio of >0.95 to about 1:1 and a pore volume of >1 cm$^3$/g and activating the resulting intermediate at elevated temperatures in an oxidizing atmosphere, and
   B) at least one compound of the formulae I to IV $$MR \qquad (I)$$
$$M^1R_2 \qquad (II)$$
$$M^2R_{3-n}^1X_n \qquad (III)$$
$$MM^2RR_3^1 \qquad (IV)$$

where
M is lithium, sodium or potassium,
$M^1$ is magnesium or zinc,
$M^2$ is boron or aluminum,
R is $C_1$–$C_{10}$-alkyl or $C_6$–$C_{20}$-aryl,
$R^1$ is R, $C_1$–$C_{10}$-alkoxy or $C_6$–$C_{20}$-aryloxy,
X is chlorine, bromine or iodine,
n is 0, 1 or 2;
as cocatalyst.

2. A Phillips catalyst as defined in claim 1, wherein the pore volume of the finely divided aluminum phosphate is >1.3 cm$^3$/g.

3. A Phillips catalyst as defined in claim 1, wherein at least one compound of the formulae I to IV where
M is lithium,
R is $C_1$–$C_6$-alkyl or phenyl,
$R^1$ is $C_1$–$C_6$-alkyl, phenyl, $C_1$–$C_6$-alkoxy or phenoxy,
X is chlorine,
is used as cocatalyst (B).

4. A Phillips catalyst as defined in claim 1, wherein at least one of $C_1$–$C_6$-alkyllithium, di($C_1$–$C_6$-alkyl)magnesium, di($C_1$–$C_6$-alkyl)zinc, tri($C_1$–$C_6$-alkyl)borane, tri($C_1$–$C_6$-alkyl) borate, triphenylborane, triphenyl borate, di($C_1$–$C_6$-alkyl)($C_1$–$C_6$-alkoxy)-, di($C_1$–$C_6$-alkyl)-phenyl-, di($C_1$–$C_6$-alkoxy)($C_1$–$C_6$alkyl)-, di($C_1$–$C_6$-alkoxy)phenyl-, ($C_1$–$C_6$-alkyl)diphenyl- and/or ($C_1$–$C_6$-alkoxy)diphenylborane, tri($C_1$–$C_6$-alkyl)aluminum, di($C_1$–$C_6$-alkyl)aluminum ($C_1$–$C_6$-alkoxide), di($C_1$–$C_6$-alkyl)aluminum chloride or ($C_1$–$C_6$-alkyl)aluminum dichloride is used as cocatalyst (B).

5. A Phillips catalyst as defined in claim 1, wherein triethylborane is used as cocatalyst (B).

6. A Phillips catalyst as defined in claim 1, wherein triethylborane and butyllithium in the molar ratio from 4:1 to 1:4 are used as catalyst (B).

* * * * *

UNITED STATES PATENT AND TRADEMARK OFFICE
CERTIFICATE OF CORRECTION

PATENT NO.: 5,324,697

DATED: June 28, 1994

INVENTOR(S): MUELLER et al.

It is certified that error appears in the above-identified patent and that said Letters Patent is hereby corrected as shown below:

Title page, item [57], formula (III), "$M^2R_{3-n}{}^1X_n$" should read --$M^2R^1{}_{3-n}X_n$--; and formula (IV), "$MM^2RR_3{}^1$" should read --$MM^2RR^1{}_3$--.

Column 7, claim 1, line 39, "an" should read --and--.

Column 8, claim 1, formulas (III), "$M^2R_{3-n}{}^1X_n$" should read --$M^2R^1{}_{3-n}X_n$--; and formula (IV), "$MM^2RR_3{}^1$" should read --$MM^2RR^1{}_3$--.

Column 8, claim 1, line 14, "$C_1C_{10}$-alkyl" should read --$C_1$-$C_{10}$-alkyl--.

Column 8, claim 4, line 34, "$(C_1$-$C_6$alkyl)-" should read -- $(C_1$-$C_6$-alkyl)- --.

Signed and Sealed this

Sixth Day of December, 1994

Attest:

BRUCE LEHMAN

Attesting Officer

Commissioner of Patents and Trademarks